United States Patent
Novack et al.

(10) Patent No.: US 8,763,011 B2
(45) Date of Patent: *Jun. 24, 2014

(54) TRANSACTION TOOL MANAGEMENT INTEGRATION WITH CHANGE MANAGEMENT

(75) Inventors: Brian M. Novack, St. Louis, MO (US); Michael David Cheaney, Arnold, MO (US); Timothy R. Thompson, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/534,748

(22) Filed: Jun. 27, 2012

(65) Prior Publication Data

US 2012/0272250 A1   Oct. 25, 2012

Related U.S. Application Data

(63) Continuation of application No. 12/640,060, filed on Dec. 17, 2009, now Pat. No. 8,234,659, which is a continuation of application No. 10/975,335, filed on Oct. 29, 2004, now Pat. No. 7,661,110.

(51) Int. Cl.
 *G06F 13/00* (2006.01)
(52) U.S. Cl.
 USPC .......................................... 719/313; 719/318
(58) Field of Classification Search
 CPC .................................... G06F 9/54; G06F 9/542
 See application file for complete search history.

(56) References Cited

U.S. PATENT DOCUMENTS

| | | | |
|---|---|---|---|
| 5,790,664 | A | 8/1998 | Coley et al. |
| 5,903,882 | A | 5/1999 | Asay et al. |
| 6,023,766 | A | 2/2000 | Yamamura |
| 6,134,658 | A | 10/2000 | Multerer et al. |
| 6,799,277 | B2 | 9/2004 | Colvin |
| 6,922,776 | B2 | 7/2005 | Cook et al. |
| 7,209,889 | B1 | 4/2007 | Whitfield |
| 7,216,226 | B2 | 5/2007 | Ndiaye |
| 7,546,454 | B2 | 6/2009 | Novack et al. |
| 7,661,110 | B2 | 2/2010 | Novack et al. |
| 8,234,659 | B2 | 7/2012 | Novack et al. |
| 2003/0069836 | A1 | 4/2003 | Penney et al. |
| 2003/0149653 | A1 | 8/2003 | Penney et al. |
| 2003/0188161 | A1 | 10/2003 | Ndiaye |
| 2006/0015729 | A1 | 1/2006 | Novack et al. |
| 2006/0041507 | A1 | 2/2006 | Novack et al. |

FOREIGN PATENT DOCUMENTS

JP        2002-215826         8/2002

*Primary Examiner* — Andy Ho
(74) *Attorney, Agent, or Firm* — Greenblum & Bernstein, P.L.C.

(57) ABSTRACT

A change management system is integrated with a transaction tool management system including a processor for scheduling a change in status of at least one transaction tool of the transaction tool management system. The system includes a receiver that receives a request for approval of the change in the status of the at least one transaction tool, a storage that stores the received request, a transaction tool classification process module that classifies transaction tools, and a change management module that schedules the change in status when the request for approval is approved. The change management module uses classification information from the transaction tool classification process module to schedule the change in status. The change management system uses information available from the transaction tool management system to schedule the change in the status of the at least one transaction tool managed by the transaction tool management system.

20 Claims, 5 Drawing Sheets

TRANSACTION TOOL MANAGEMENT INTEGRATION WITH CHANGE MANAGEMENT

CROSS REFERENCE TO RELATED APPLICATIONS

This application is a continuation of U.S. patent application Ser. No. 12/640,060 filed on Dec. 17, 2009, now U.S. Pat. No. 8,234,659, issued on Jul. 31, 2012, which is a continuation of U.S. patent application Ser. No. 10/975,335, filed Oct. 29, 2004, now U.S. Pat. No. 7,661,110, issued on Feb. 9, 2010, the contents of which are expressly incorporated by reference herein in their entireties.

BACKGROUND OF THE INVENTION

1. Field of the Invention

The present invention relates to transaction tool management. More particularly, the present invention relates to integrating change management with transaction tool management for transaction tools used in a communications network.

2. Background Information

Transaction tools are instruments issued by a third party to facilitate transactions by "vouching" for a holder's identity and/or trustworthiness. Accordingly, transaction tools are used to authenticate the identity or trustworthiness of a bearer. Transaction tools are increasingly being managed for issuers and recipients by management systems. As an example, for an issuer of credit cards, a management system may facilitate day-to-day transactions by verifying credit availability. Additionally, for an issuer of digital certificates, a management system may facilitate day-to-day transactions by authenticating the validity of a digital certificate. Furthermore, from a recipient standpoint, a corporation may use a management system to manage digital certificates installed by employees on computers in the corporation's network. However, while the transaction tool management systems are available for transaction tools, the transaction tool management systems do not provide change management functionality for managing lifecycle events for transaction tools.

Change management is a term for the management of lifecycle events for hardware and software installed in a network. Alternatively, change management may be identified as component resource management or any other management system that provides the functionality of the change management systems described herein. As an example, Vantive System 8.0.2 from Vantive Corporation of Santa Clara, Calif., can be customized to generate problem reports and request lifecycle changes to hardware and software used in a local computer network. Other software used for change management includes ProblemTracker from NetResults Corporation of Palo Alto, Va. In a typical change management system, each requested change requires manual input and human interaction, which may be an extraordinary burden in a large network with numerous pieces of hardware and software. For example, the Vantive system records changes and, where appropriate, generates requests for approval of changes which require the approval of particular managers. The approvals are required because, in some circumstances, the requested change will, e.g., incur costs or require that a component of the local computer network be taken out of service.

Change management systems, if provided at all, are provided separately from the transaction tool management systems. Further, even if a change management system is provided, it is not integrated with a transaction tool management system. As an example, the installation of an X.509 digital certificate on a server may only be recorded in a change management system if the server needs to be restarted as part of the process. However, another lifecycle event involving a transaction tool may not be recorded in the change management system. The result is that lifecycle events and changes which could be addressed automatically using an integrated system are instead individually managed on a case-by-case basis using only a change management system.

When such lifecycle events for transaction tools are not coordinated (i.e., managed), the ability of a corporation to ensure the availability of a network is jeopardized. However, a change control coordinator is not even always aware of such lifecycle events when a network includes numerous hardware and software components and entries for changes are recorded manually. Accordingly, a need exists to integrate change management into transaction tool management, so that appropriate notifications can be automatically made using the information and functionality of a transaction tool management system.

As an example, when a recipient renews an X.509 certificate on a computer (e.g., a server or personal computer) in a local network, the computer may require restarting/rebooting. Therefore, a request for such a change is logged in a change management system such as Vantive, and notifications are sent to managers so that approvals can be obtained. Generating and processing such requests for a network with numerous computers is inefficient, particularly when a transaction tool management system is already aware of an impending expiration for the digital certificate to be renewed such that a request to renew a digital certificate could be generated automatically. Accordingly, if the information available to a transaction tool management system were to be provided to a change management system, resources could be used more efficiently. In particular, integrating transaction tool management and change management will reduce the need for human interaction in implementing lifecycle changes. Accordingly, a need exists for integration of transaction tool management with change management.

To solve the above-described problems, a system is provided for transaction tool management integration with change management.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which.

DETAILED DESCRIPTION OF THE INVENTION

Figure 1:
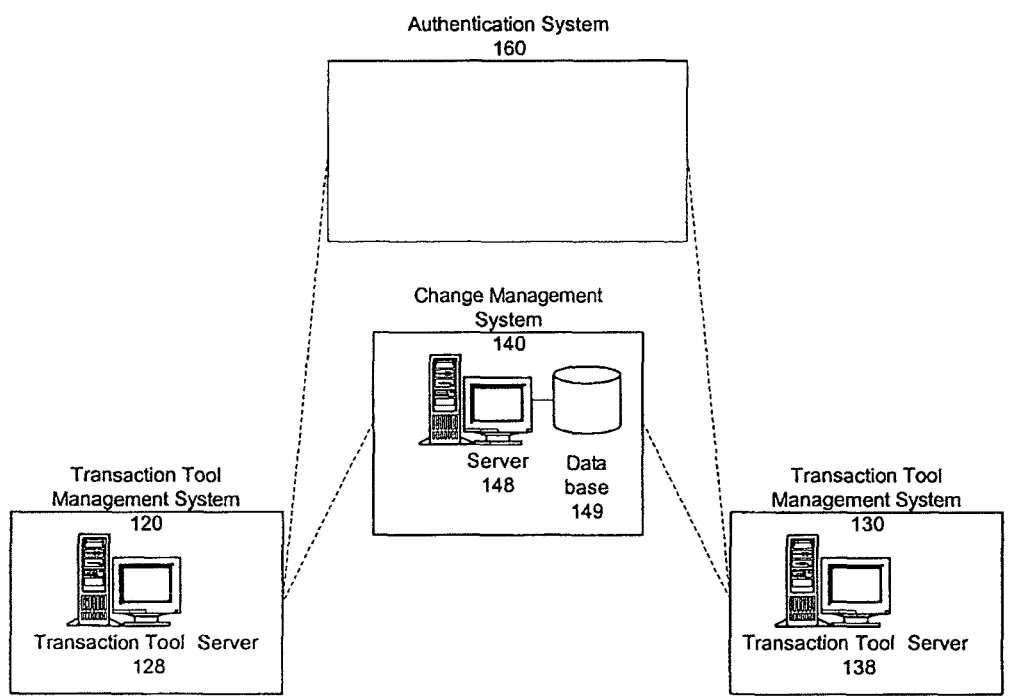
FIG. 1 shows an exemplary communications network architecture for transaction tool management integration with change management, according to an aspect of the present invention.

In view of the foregoing, the present invention, through one or more of its various aspects, embodiments and/or specific features or sub-components, is thus intended to bring out one or more of the advantages as specifically noted below.

According to an aspect of the present invention, a change management system coordinates information of a transaction tool managed by a transaction tool management system. The system includes a receiver that receives, over a communications network, activity information and/or lifecycle event information for the transaction tool. The system also includes a storage that stores the received information. The system further includes a processor that manages a change in a status of the transaction tool based on the received information.

According to another aspect of the present invention, the change management system includes a notifier that generates a perceptible notification for an impending change in the status of the transaction tool.

According to yet another aspect of the present invention, the received information is received from a manager that manages the transaction tool for an issuer of the transaction tool.

According to still another aspect of the present invention, the receiver receives requests for approval of changes to the status of the transaction tool. The requests for approval are received by the change management system from a client device that forwards the requests to the change management system. The change management system determines whether to approve the requested changes and notifies the client device of the determination.

According to another aspect of the present invention, the change in the status includes renewing an expiring transaction tool.

According to yet another aspect of the present invention, the received information includes information related to an upgrade to the transaction tool.

According to still another aspect of the present invention, the received information is received in response to a status inquiry by the change management system.

According to an aspect of the present invention, a method is provided for coordinating information of a transaction tool managed by a transaction tool management system. The method includes receiving, over a communications network, activity information and/or lifecycle event information for the transaction tool. The method also includes storing the received information. The method further includes managing a change in a status of the transaction tool based on the received information.

According to another aspect of the present invention, the method includes generating a perceptible notification for an impending change in the status of the transaction tool.

According to yet another aspect of the present invention, the received information is received from a manager that manages the transaction tool for an issuer of the transaction tool.

According to still another aspect of the present invention, the method includes receiving requests for approval of changes to the status of the transaction tool. The requests for approval are received by the change management system from a client device that forwards the requests to the change management system. The method also includes determining whether to approve the requested changes and notifying the client device of the determination.

According to another aspect of the present invention, the change in the status includes renewing an expiring transaction tool.

According to yet another aspect of the present invention, the lifecycle management information includes information related to an upgrade of the transaction tool.

According to still another aspect of the present invention, the lifecycle management information is received in response to a status inquiry by a change management system.

According to an aspect of the present invention a computer readable medium stores a program that coordinates information of a transaction tool managed by a transaction tool management system. The computer readable medium includes a receiving code segment that receives, over a communications network, activity information and/or lifecycle event information for the transaction tool. The computer readable medium also includes a storing code segment that stores the received information. The computer readable medium further includes a managing code segment that manages a change in a status of the at least one transaction tool based on the received information.

According to another aspect of the present invention, the computer readable medium includes a notifying code segment that generates a perceptible notification for an impending change in the status of the at least one transaction tool.

According to yet another aspect of the present invention, the receiving code segment receives information from a manager that manages the transaction tool for an issuer of the transaction tool.

According to still another aspect of the present invention, the receiving code segment receives requests for approval of changes to the status of the transaction tool that are automatically forwarded by a client device to a change management system. The change management system determines whether to approve the requested changes and notifies the client device of the determination.

According to another aspect of the present invention, the change in the status includes renewing an expiring transaction tool.

According to yet another aspect of the present invention, the received information includes information related to an upgrade to a transaction tool.

According to still another aspect of the present invention, the received information is received in response to a status inquiry by a change management system.

A communications system is provided for transaction tool management integration with change management. The communications system includes a change management system that manages activity information and/or lifecycle event information for a transaction tool issued to a recipient by an issuer.

FIG. 1 shows an exemplary communications network architecture for transaction tool management integration with change management. As shown, a transaction tool management system 120 and a transaction tool management system 130 are each connected to a change management system 140 as well as an authentication system 160. An exemplary communications network architecture that includes a transaction tool management system and an authentication system is disclosed in U.S. patent application Ser. No. 10/917,415 to NOVACK et al., filed Aug. 13, 2004 and entitled, "Pluggable Authentication for Transaction Tool Management Services", the disclosure of which is incorporated by reference herein in its entirety.

The transaction tool management system 120 includes a transaction tool server 128. The transaction tool management system 130 also includes a transaction tool server 138. The transaction tool servers 128, 138 may be used by, e.g., a corporation, to provide services as an issuer or as a recipient of transaction tools. When the transaction tool servers 128, 138 are used by an issuer of transaction tools, the transaction tool servers 128, 138 are used to manage transaction tools for customers and clients. When the transaction tool servers 128, 138 are used by a recipient of transaction tools, the transaction tool servers 128, 138 are used to manage transaction tools for the recipient's employees.

As an example, a telecommunications service provider may provide a network of servers and other computers for internal use, to manage components of the telecommunications network and to allow subscribers to change services. The individual servers and other computers are provided with X.509-compliant digital certificates for use in authenticating communications with subscribers, customers and employees. The transaction tool servers 128, 138 manage the transaction tools installed on the network servers for internal use, to manage components of the telecommunications network and to allow subscribers to change services.

In the example where the transaction tool management systems 120, 130 manage transaction tools for a recipient of transaction tools, the change management system 140 manages lifecycle events which involve the transaction tools managed by the transaction tool management systems 120, 130. The management of lifecycle events may include initiating the events, analyzing the events, organizing information related to the events, authorizing the events or merely recording the events. Lifecycle events may include ordering a transaction tool, receiving a transaction tool, installing a transaction tool, activating a transaction tool, using a transaction tool, upgrading or "patching" a transaction tool, extracting a transaction tool, returning a transaction tool, deleting or canceling a transaction tool, revoking a transaction tool, renewing a transaction tool, or changing any user information or term of use for the transaction tool.

When the transaction tool servers 128, 138 are used by a recipient of transaction tools, the transaction tool servers 128, 138 record information for each transaction tool being managed. The information may include an issuer of each transaction tool, a validity period for each transaction tool, and a computer in the network on which the transaction tool is installed.

An exemplary digital certificate complies with ITU-T Recommendation X.509. A digital certificate is issued by a certification authority and is installed for a networked computer such as the transaction tool servers 128, 138. The digital certificate is part of a public key infrastructure (PKI) that uses digital signatures to enhance the security and authenticity of communications between computers in a network. When lifecycle events are impending or when lifecycle changes are requested for the digital certificates managed by the transaction tool management systems 120, 130, the transaction tool management systems 120, 130 forward the lifecycle event information to the change management system 140. Accordingly, the change management system 140 manages the lifecycle events for the transaction tools managed by the transaction tool management systems 120, 130.

The transaction tool management systems 120, 130 may be provided by an issuer of transaction tools to manage the issued transaction tools. For example, a credit card company that issues credit cards may use transaction tool management systems 120, 130 to manage activity for the issued credit cards. As the credit cards themselves are the transaction tools, the transaction tool management systems 120, 130 manage credit cards that are issued to individuals and which are not necessarily associated with any particular computer.

When the transaction tool management systems 120, 130 manage transaction tools for an issuer of transaction tools, the change management system 140 manages activity and lifecycle events for the transaction tools. Accordingly, when lifecycle changes are requested for an issued transaction tool, the transaction tool management system 120, 130 interacts with the change management system 140 to manage the lifecycle events. For example, requests for an increase in a credit limit or requests to cancel or replace a credit card may be referred to the change management system 140 to obtain approvals or to record any requested changes.

The authentication system 160 can be used to authenticate communications between the transaction tool management systems 120, 130 and customers, subscribers and employees who communicate with the transaction tool management systems 120, 130. As an example, transaction requests from a customer may be forwarded to a third-party authentication system 160 to verify the customer's identity using information and/or data provided by the customer.

The change management system 140 manages lifecycle event information for transaction tools issued to or managed by the transaction tool management systems 120, 130. For example, the change management system 140 may store the date that a transaction tool will expire, and ensure that a replacement transaction tool is made available before the expiration of the original transaction tool. As another example, when the transaction tool servers 128, 138 are provided for a recipient of transaction tools, the transaction tool management systems 120, 130 may determine that a particular issuer of, e.g., digital certificates, has been compromised such that digital certificates issued by the issuer are not trustworthy. Accordingly, the change management system 140 may be contacted to schedule immediate replacements for all digital certificates, installed on the local network, that were issued by the untrustworthy issuer.

The change management system 140 includes a server 148 and a database 149. The server 148 communicates directly with the transaction tool servers 128, 138. Further, the server 148 processes information received from the transaction tool servers 128, 138 and determines whether to merely record the information or whether the information is a request for approval for a change requested for the transaction tools managed by the transaction tool servers 128, 138. Lifecycle event information for the transaction tools, including information for requested changes that were not ultimately authorized, is stored in the database 149 by the server 148.

Accordingly, the change management system 140 is integrated with the transaction tool management systems 120, 130, and efficiently uses the information available from the transaction tool management systems 120, 130 to manage lifecycle events for the transaction tools managed by the transaction tool management systems 130, 140. The change management system 140 may manage lifecycle events in response to requests for lifecycle changes from customers, clients or employees, or in response to periodic or targeted queries to the transaction tool management systems 120, 130 to obtain information regarding the transaction tools being managed.

Figure 2:
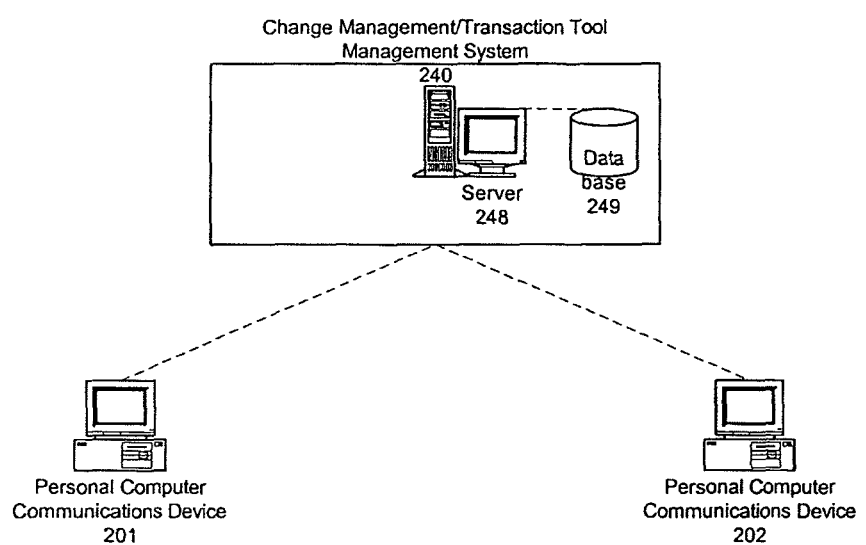
FIG. 2 shows another exemplary communications network architecture for transaction tool management integration with change management, according to an aspect of the present invention.

FIG. 2 shows another exemplary communications network architecture for transaction tool management integration with change management. In the embodiment shown in FIG. 2, personal computer communications devices 201 and 202 are managed by an integrated change management/transaction tool management system 240. The change management/transaction tool management system 240 includes a server 248 and a database 249.

As an example, the personal computer communications devices 201, 202 are each provided with a transaction tool, such as an X.509 compliant digital certificate that is managed by the change management/transaction tool management system 240. Accordingly, the change management/transaction tool management system 240 manages activities and lifecycle events for the digital certificates provided to the personal computers 201, 202.

When lifecycle events are requested for the personal computers 201, 202 for the transaction tools, the change management/transaction tool management system 240 determines whether to authorize the requested lifecycle events. For example, the change management/transaction tool management system 240 may determine whether to authorize installation of a transaction tool, an update or "patch" for a transaction tool, removal of a transaction tool, cancellation of a transaction tool, or replacement of a transaction tool for the personal computer communications devices 201, 202. The server 248 is provided with logic that is used as a basis for the determinations related to the authorizations for lifecycle events. The server 248 may also manage lifecycle events for transaction tools installed on the personal computers 201, 202, even when the lifecycle events are not requested by the user of the personal computers 201, 202. For example, the server 248 may initiate cancellation of one or more digital certificates when the server 248 determines that the digital certificates are compromised or issued by an untrustworthy issuer. Data for the lifecycle events and activities of the transaction tools, including requested changes that were not ultimately authorized, is stored in the database 249.

As another example, the personal computer communications devices 201, 202 may be used by a credit card recipient to perform transactions over the internet. The change management/transaction tool management system 240 receives requests for changes to the status of the credit cards. For example, a user of the personal computer 201 may request an increase in the credit line for a credit card. The request is processed by the change management/transaction tool management system 240, and the information of the request and authorization or denial is stored in the database 249.

As an example of the uses of the communications network architecture shown in FIG. 2, a credit card company may allow credit card users to activate or cancel a credit card, review transaction and payment history, and conduct transactions such as cash advances or balance transfers, by contacting the credit card company's servers over the internet. The change management/transaction tool management system 240 processes information for the credit card company's customers. However, the credit card company provides customers with the ability to conduct both normal inquiry and credit authorizations, as well as to request lifecycle changes for the credit card. Accordingly, the change management/transaction tool management system 240 stores and processes information related to changes in the status of credit cards issued to users of the personal computers 201, 202. According to the embodiment shown in FIG. 2, an integrated change management/transaction tool management system 240 can be used for processing activity and lifecycle event information of credit cards issued to users of the personal computers 201, 202. As a result, human interaction in lifecycle event processing is greatly reduced by using a system that integrates transaction tool management with change management.

Figure 3:
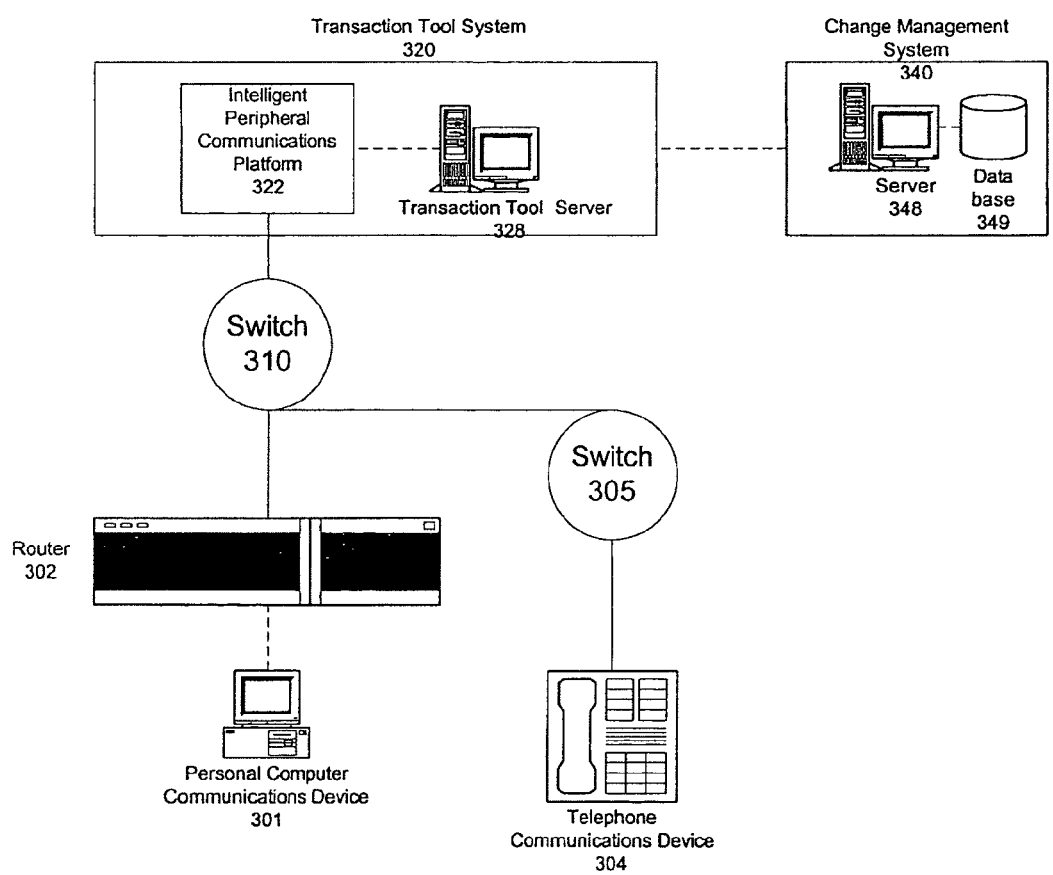
FIG. 3 shows another exemplary communications network architecture for transaction tool management integration with change management, according to an aspect of the present invention.

FIG. 3 shows another exemplary communications network architecture for transaction tool management integration with change management. In the embodiment shown in FIG. 3, personal computer communications device 301 is connected to a switch 310 via a router 302. The router 302 translates packetized data such as Voice over Internet Protocol samples into audible speech samples that are routed through a telecommunications network that includes the switch 310. A telephone communications device 304 is also connected to the switch 310 via a switch 305.

The switch 310 is connected to an intelligent peripheral communications platform 322 that is a component of a transaction tool system 320. The transaction tool system 320 also includes a transaction tool server 328. The intelligent peripheral communications platform 322 interacts with users of the personal computer 301 and/or the telephone 304 using audible signals and interacts with the transaction tool server 328 using data signals.

The transaction tool system 320 performs transactions for customers, clients or employees that are issued transaction tools, such as credit cards. For example, the transaction tool system 320 obtains information of the transaction tool and ascertains whether the transaction tool is valid and updated. Additionally, the transaction tool system 320 may request additional information about the user of the personal computer 301 or the telephone 304 to ensure the user is authorized to conduct transactions using the transaction tool.

A change management system 340 is provided separately from the transaction tool system 320, and manages lifecycle changes for transaction tools. The change management system 340 includes a server 348 and a database 349. The server 348 communicates with the transaction tool server 328, and information for changes that are managed by the change management system is stored in the database 349. For example, the user of the personal computer 301 or the telephone 304 may report a lost card or request a replacement of a lost credit card, in which case the change management system 340 is contacted to obtain authorization for the cancellation and/or replacement of the credit card. When lifecycle changes for the credit card are made, the change management system 340 informs the transaction tool system 320 so that transactions are properly managed by the transaction tool system using the information of the change. As an example, the change management system 340 may inform the transaction tool system 320 to deny all transactions that are attempted using a lost or stolen credit card.

Accordingly, transaction tool management is integrated with change management by providing the transaction tool system 320 and the change management system 340 to users using the internet or a telecommunications system.

Figure 4:
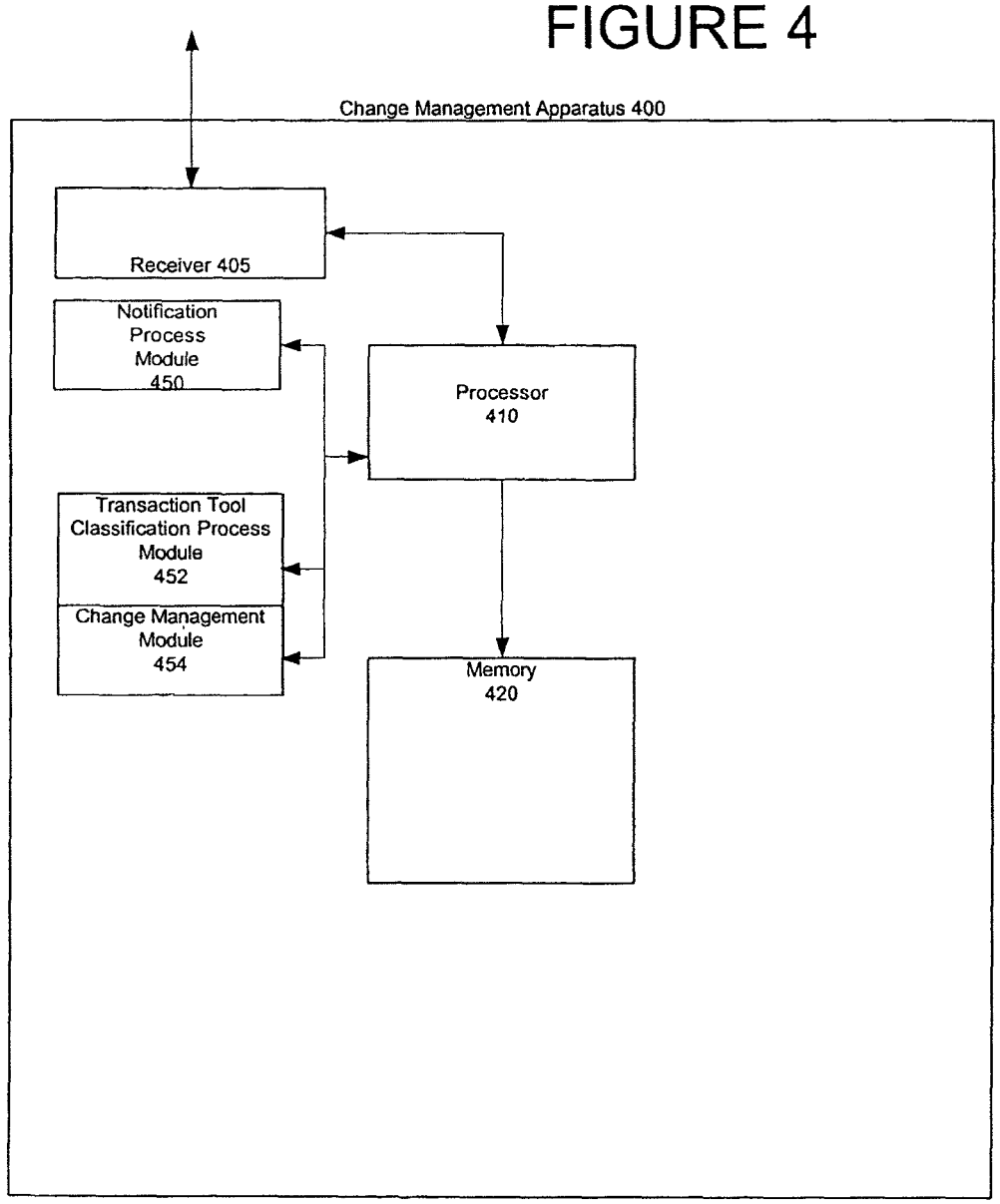
FIG. 4 shows an exemplary change management apparatus for transaction tool management integration with change management, according to an aspect of the present invention.

FIG. 4 shows an exemplary change management apparatus 400 for transaction tool management integration with change management. The change management apparatus 400 includes a receiver 405 that receives incoming requests from a transaction tool management system. A processor 410 is also provided to centrally process transactions for the change management apparatus 400, and a memory 420 is provided to store instructions and data for the change management apparatus 400. The processor 410 executes instructions for a notification process module 450, a transaction tool classification process module 452 and a change management module 454.

The notification process module 450 includes instructions to notify a user, a manager, or a device when a change is authorized by the change management apparatus 400 for a transaction tool. For example, a change that is authorized for a digital certificate on a server may require only a notification to the manager responsible for the server and one or more system managers. However, a change that requires shutting down and rebooting a system component may require approval of one or more managers. The notification process module 450 determines who to notify depending on the transaction tool, the requested change, and the implications, if any, that the change will have on system availability.

The transaction tool classification process module 452 classifies transaction tools for the change management apparatus 400. For example, the transaction tool classification process module 452 may classify transaction tools by the type and function of the computers on which they are installed. For example, for a large telecommunications system that provides digital certificates for both servers and, e.g., personal computers, lifecycle changes may be approved depending on the classification and importance of the server or personal computer. Additionally, the timing of lifecycle changes that effect system availability may be determined based on the classifications made by the transaction tool classification process module 452. In this regard, an installation, renewal or replacement of a digital certificate for an unimportant personal computer may not require anything more than a notification to the user when the change is approved. However, such a change for a digital certificate for a server that is used by the public or numerous employees may require notification and approval of one or more managers, particularly if the server is to be taken out of service. The request for a lifecycle change is made either automatically by the transaction tool management system or by a requestor.

Where overlapping critical functionality is provided by a limited number of devices, the change management apparatus 400 may determine that only one such device may be taken out of service at any time for lifecycle changes. The transaction tool classification process module 452 categorizes computers in the local network according to the functionality they provide. Of course, computers may be placed in multiple categories depending on the various functions and services they provide.

The change management module 454 includes rules for the change management. The change management module 454 determines whether a particular change requires approvals or only notifications. Additionally, the change management module 454 may include logic to determine when a requested change is to be authorized. For example, requests to install a digital certificate from a particular issuer may be automatically denied if the issuer is deemed untrustworthy or unrecognized. Additionally, the change management module 454 may schedule particular changes, to ensure system availability for redundant parts that cannot all be taken out of service at the same time. The scheduling by the change management module 454 takes into consideration the classifications by the transaction tool classification process module 452. As an example, if multiple servers are provided as internet gateways by an internet service provider, the servers for a particular geographic area should not all be taken out of service at the same time, even if the transaction tools (e.g., digital certificates) installed on the servers all expire at the same time. Accordingly, the change management module may schedule replacements or renewals for transaction tools before the transaction tools expire.

Figure 5:
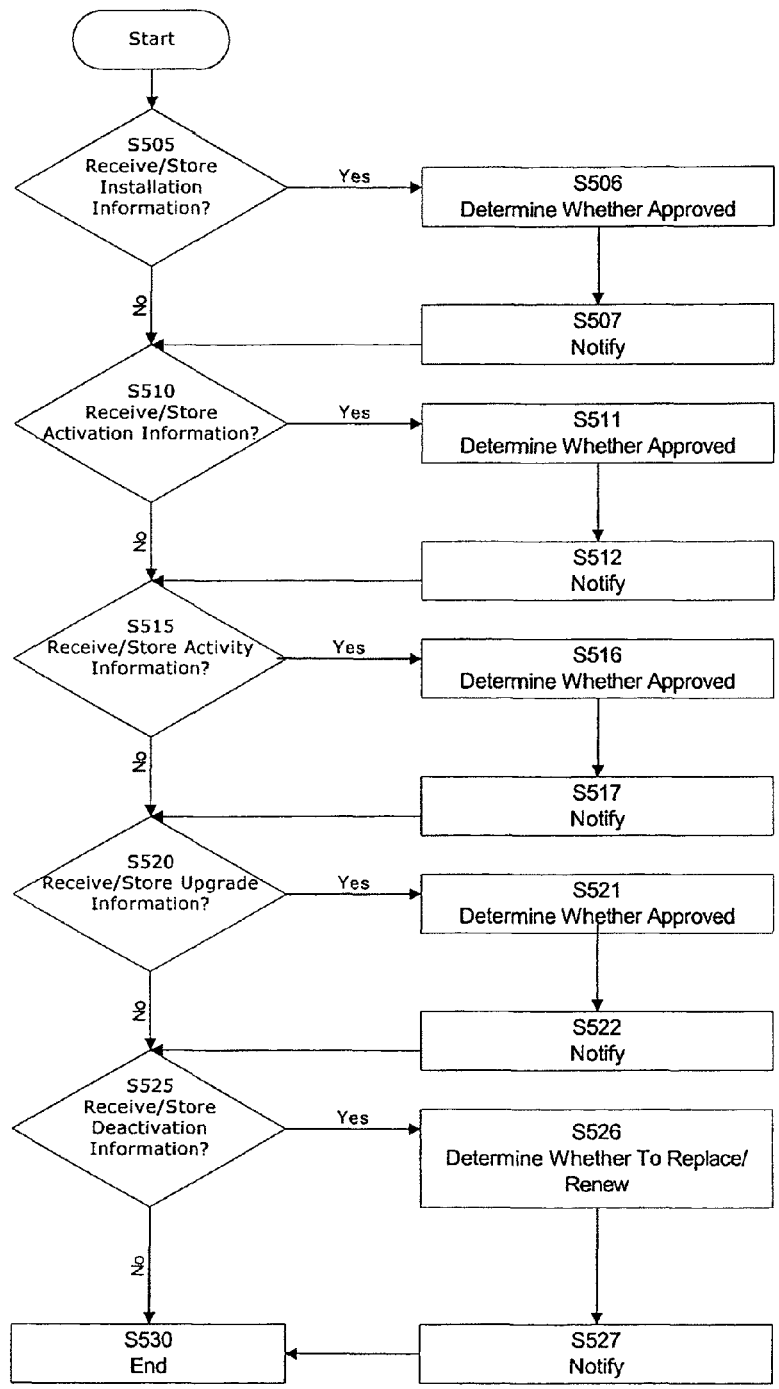
FIG. 5 is a flow diagram showing a method of transaction tool management integration with change management, according to an aspect of the present invention.

FIG. 5 shows an exemplary method of operation for a change management system that is integrated with a transaction tool management system. After the process starts, the change management system determines whether installation information has been received and stored at S505. If installation information has been received and stored (S505=Yes), an approval determination is made at S506 and notification is made at S507. If installation information has not been received (S505=No) or after the notification at S507, the change management system determines whether activation information has been received and stored at S510. If activation information has been received and stored (S510=Yes), an approval determination is made at S511 and notifications is made at S512.

If activation information has not been received and stored (S510=No) or after the notification at S512, the change management system determines whether activity information has been received and stored at S515. If activity information has been received (S515=Yes), an approval determination is made at S516 and notification is made at S517.

If activity information is not received (S515=No) or after notification is made at S517, the change management system determines whether upgrade information has been received and stored at S520. If upgrade information has been received and stored (S520=Yes), an approval determination is made at S521 and notification is made at S522.

If upgrade information is not received (S520=No) or after notification is made at S522, the change management system determines whether deactivation information has been received and stored at S525. If deactivation information has been received and stored (S525=Yes), a determination is made whether to replace or renew the transaction tool at S526 and notification is made at S527. The process ends at S530 if deactivation information has not been received (S525=No) or after notification has occurred at S527.

Accordingly, a variety of activities and/or lifecycle events can be managed using the process shown in FIG. 5 or a similar process. Of course, the steps shown in FIG. 5 may be performed in a different order, or not be performed at all. Furthermore, additional lifecycle events may be managed by the change management system that performs the operations shown in FIG. 5. For example, although not shown, the notifications generated at S507, S512, S517, S522 and S527 may be requests that have to be approved by specified individuals. Accordingly, the operations of a change management system may include waiting for specific approval from one or more notified individuals before the change management system approves a requested change.

Further, rather than waiting for requests for lifecycle changes from a user, a transaction tool management system may initiate inquiries to obtain information of transaction tools installed on a network. The retrieved information may be provided to a change management system that schedules, in advance, lifecycle events, without waiting for the lifecycle events to be specifically requested by an end user. An exemplary digital certificate discovery and management system which can initiate inquiries is disclosed in U.S. patent application Ser. No. 10/879,217 to NOVACK et al., filed on Jun. 30, 2004 and entitled "Automatic Digital Certificate Discovery and Management", the disclosure of which is incorporated by reference herein in its entirety.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims. For example, instead of communicating with Voice over Internet Protocol (VoIP), the personal computer 301 in FIG. 3 may communicate using multiprotocol label switching (MPLS) or any other standard for packet-switched communications.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. For example, each of the standards for digital certificate format (e.g., X.509) and packet switched network transmission (e.g., VOIP, MPLS) represent examples of the state of the art. Such standards are periodically superseded by faster or more efficient equivalents having essentially the same functions. Accordingly, replacement standards and protocols having the same functions are considered equivalents.

What is claimed is:

1. A change management system integrated with a transaction tool management system, the change management system comprising:
 a processor that manages a change in status of a transaction tool of the transaction tool management system;
 a receiver that receives a request for approval of the change in the status of the transaction tool;
 a memory that stores the received request;
 a transaction tool classification process module that classifies transaction tools; and
 a change management module that schedules the change in the status when the request for approval is approved, the change management module using classification information from the transaction tool classification process module to schedule the change in the status,
 wherein the change management system uses information available from the transaction tool management system to manage the change in the status of the transaction tool managed by the transaction tool management system.

2. The change management system of claim 1, wherein the transaction tool classification process module classifies the transaction tools by type of hardware on which the transaction tools are installed.

3. The change management system of claim 1, wherein the transaction tool classification process module classifies the transaction tools by functionality of hardware on which the transaction tools are installed.

4. The change management system of claim 1, wherein the change in the status of the transaction tool comprises revoking the transaction tool.

5. The change management system of claim 1, wherein the request for approval is contingent on approval from an authorized entity.

6. The change management system of claim 1, further comprising a notification process module that notifies a user when a change in status is authorized.

7. The change management system of claim 1, further comprising a notification process module that notifies a device when a change in status is authorized.

8. A method for scheduling a change in status of a transaction tool managed by a transaction tool management system integrated with a change management system, the method comprising:
 receiving a request for approval of the change in the status of the transaction tool;
 storing the received request;
 scheduling, with a processor, the change in the status when the request for approval is approved, a change management module using classification information from a transaction tool classification process module that classifies transaction tools, to schedule the change in the status,
 wherein the change management system uses information available from the transaction tool management system to manage the change in the status of the transaction tool managed by the transaction tool management system.

9. The method for scheduling a change in status of the transaction tool of claim 8, wherein the transaction tool classification process module classifies the transaction tools by type of hardware on which the transaction tools are installed.

10. The method for scheduling a change in status of the transaction tool of claim 8, wherein the transaction tool classification process module classifies the transaction tools by functionality of hardware on which the transaction tools are installed.

11. The method for scheduling a change in status of the transaction tool of claim 8, wherein the change in the status of the transaction tool comprises revoking the transaction tool.

12. The method for scheduling a change in status of the transaction tool of claim 8, wherein the request for approval is contingent on approval from an authorized entity.

13. The method for scheduling a change in status of the transaction tool of claim 8, further comprising a notification process module that notifies a user when a change in status is authorized.

14. The method for scheduling a change in status of the transaction tool of claim 8, further comprising a notification process module that notifies a device when a change in status is authorized.

15. A non-transitory computer readable storage medium encoded with an executable computer program for scheduling a change in status of a transaction tool of the transaction tool managed by a transaction tool management system integrated with a change management system and that when executed by a processor, causes the processor to perform operations comprising:
 receiving a request for approval of the change in the status of the transaction tool;
 storing the request;
 scheduling a change in the status when the request for approval is approved, a change management module using classification information from a transaction tool classification process module that classifies transaction tools, to schedule the change in the status,
 wherein the change management system uses information available from the transaction tool management system to manage the change in the status of the transaction tool managed by the transaction tool management system.

16. The non-transitory computer readable storage medium of claim 15, wherein the transaction tool classification process module classifies the transaction tools by type and functionality of hardware on which the transaction tools are installed.

17. The non-transitory computer readable storage medium of claim 15, wherein the change in the status of the transaction tool comprises revoking the transaction tool.

18. The non-transitory computer readable storage medium of claim 15, wherein the request for approval is contingent on approval from an authorized entity.

19. The non-transitory computer readable storage medium of claim 15, further comprising a notification process module that notifies a user when a change in status is authorized.

20. The non-transitory computer readable storage medium of claim 15, further comprising a notification process module that notifies a device when a change is in status authorized.

* * * * *